(12) United States Patent
Major et al.

(10) Patent No.: US 8,332,098 B2
(45) Date of Patent: Dec. 11, 2012

(54) A/C COMPRESSOR CLUTCH POWER MANAGEMENT

(75) Inventors: Gregory A. Major, Farmington Hills, MI (US); Kenneth L. Porrett, Grand Blanc, MI (US); John I. Frey, Shelby Township, MI (US); Shawn L. Boozer, Clarkston, MI (US); Edwin J. Stanke, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 804 days.

(21) Appl. No.: 12/257,536

(22) Filed: Oct. 24, 2008

(65) Prior Publication Data

US 2010/0106362 A1  Apr. 29, 2010

(51) Int. Cl.
*G06F 17/00* (2006.01)
*B60H 1/32* (2006.01)

(52) U.S. Cl. .............................. 701/36; 67/62; 67/323.4

(58) Field of Classification Search ................. 701/29, 701/36, 67; 62/193, 323.3, 470, 236, 244, 62/227, 228.5, 230, 323.4; 165/203, 10, 165/43; 477/3
See application file for complete search history.

(56) References Cited

U.S. PATENT DOCUMENTS

| 3,876,053 | A | * | 4/1975 | Giolitti et al. | 400/164.2 |
| 4,376,476 | A | | 3/1983 | Hagiri | |
| 4,841,734 | A | * | 6/1989 | Torrence | 62/115 |
| 5,209,141 | A | * | 5/1993 | Asayama et al. | 477/154 |
| 5,533,353 | A | * | 7/1996 | Baker et al. | 62/227 |
| 5,941,358 | A | * | 8/1999 | Hosseini et al. | 192/85.63 |
| 7,543,454 | B2 | * | 6/2009 | Harris | 62/115 |
| 2004/0163400 | A1 | * | 8/2004 | Suzuki et al. | 62/228.4 |
| 2005/0268632 | A1 | * | 12/2005 | Yonekura et al. | 62/236 |
| 2006/0107681 | A1 | * | 5/2006 | Uno et al. | 62/323.1 |

FOREIGN PATENT DOCUMENTS

| DE | 10053426 A1 | 5/2001 |
| EP | 1039164 A2 | 9/2000 |
| JP | 2003240025 A | 8/2003 |

* cited by examiner

*Primary Examiner* — Ronnie Mancho

(57) ABSTRACT

A method of controlling a power input to a compressor clutch, via an A/C clutch voltage controller, that selectively drives an A/C compressor in a vehicle HVAC system is disclosed. The method may comprise the steps of: determining a first electric power level needed to cause the compressor clutch to move to a full engagement position from a compressor clutch non-engagement position; applying the first electric power level to the compressor clutch to cause the compressor clutch to move to the full engagement position; determining a second electric power level, which is lower than the first electric power level, needed to maintain the compressor clutch in the full engagement position; and applying the second electric power level to the compressor clutch to maintain the compressor clutch in the full engagement position.

12 Claims, 4 Drawing Sheets

A/C COMPRESSOR CLUTCH POWER MANAGEMENT

BACKGROUND OF INVENTION

The present invention relates generally to air conditioning (A/C) compressors used in vehicle heating, ventilation and air conditioning (HVAC) systems, and more particularly to control of a compressor clutch employed with such A/C compressors.

There is a significant drive to improve the fuel economy of automotive vehicles. One vehicle operation that reduces fuel economy is air conditioning. The operation of the A/C compressor consumes a significant amount of energy. Thus, it is desirable to reduce the energy that is consumed to operate the A/C compressor.

SUMMARY OF INVENTION

An embodiment contemplates a method of controlling an electric power input to a compressor clutch that selectively drives an A/C compressor in a vehicle HVAC system, the method comprising the steps of: determining a first electric power level needed to cause the compressor clutch to move to a full engagement position from a compressor clutch non-engagement position; applying the first electric power level to the compressor clutch to cause the compressor clutch to move to the full engagement position; determining a second electric power level, which is lower than the first electric power level, needed to maintain the compressor clutch in the full engagement position; and applying the second electric power level to the compressor clutch to maintain the compressor clutch in the full engagement position.

An embodiment contemplates a vehicle HVAC system, which may include an A/C compressor, a compressor clutch that selectively engages the A/C compressor with a source of driving torque, an HVAC comfort control module, and an engine control unit. The vehicle HVAC system may also include an A/C clutch voltage controller that receives inputs from the HVAC comfort and control module and the engine control unit, and directs a zero voltage to the compressor clutch for clutch disengagement and varying levels of voltages to the compressor clutch for obtaining and maintaining clutch full engagement based on vehicle operating conditions.

An advantage of an embodiment is that the power used to maintain the compressor clutch is reduced, thus reducing the overall power used to operate the HVAC system in the A/C mode. This may result in improved fuel economy for the vehicle. The improved compressor clutch control may also improve the control of clutch slippage on engagement, which may lead to improved compressor life and reduced noise during clutch engagement.

DETAILED DESCRIPTION

Figure 1:
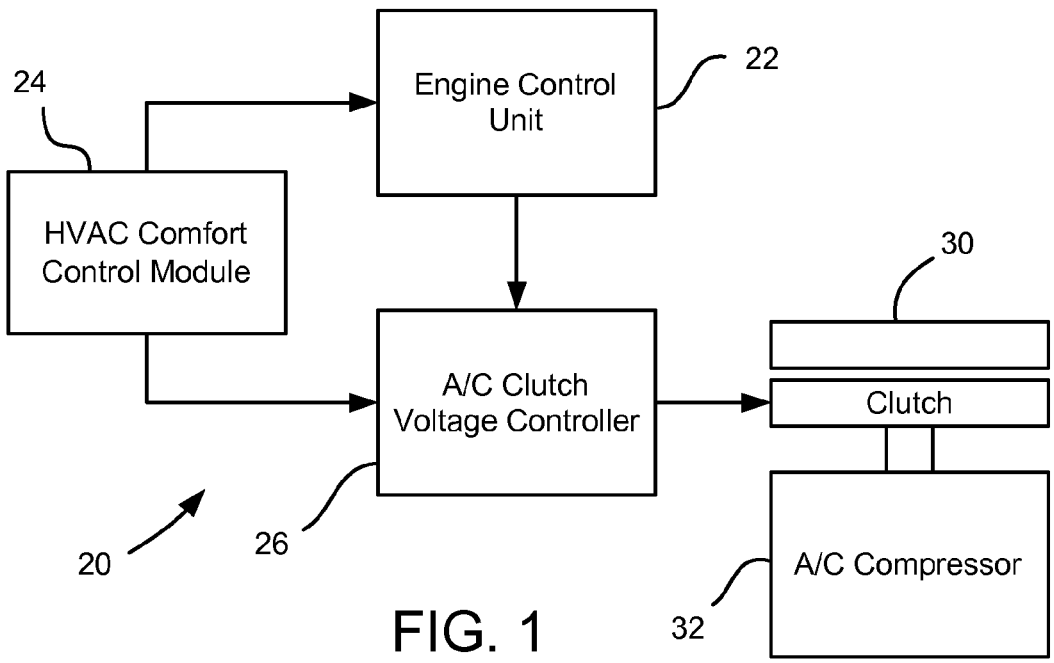
FIG. 1 is a schematic diagram of an A/C compressor and clutch control.

Referring to FIG. 1, a portion of an HVAC system, indicated generally at 20, and an engine control unit 22, are shown. The HVAC system 20 includes an HVAC comfort control module 24 and an A/C clutch voltage controller 26. The HVAC comfort control module 24 is in communication with the engine control unit 22 and the A/C clutch voltage controller 26, which is also in communication with the engine control unit 22. The A/C clutch voltage controller 26 controls the voltage input to a compressor clutch 30.

The compressor clutch 30 is an electromagnetic clutch where flux in a coil provides the force required to engage the clutch 30 and maintain the clutch 30 in an engaged position. The compressor clutch 30 selectively connects an A/C (refrigerant) compressor 32 with a source of torque (not shown) for driving the compressor 32. The source of torque, for example, may be a belt (not shown) driven by an internal combustion engine (not shown). The compressor 32 may be a fixed displacement compressor or an external variable compressor where compressor capacity is externally controlled (as opposed to an internally variable compressor where capacity is internally controlled and no compressor clutch is employed).

Figure 2:
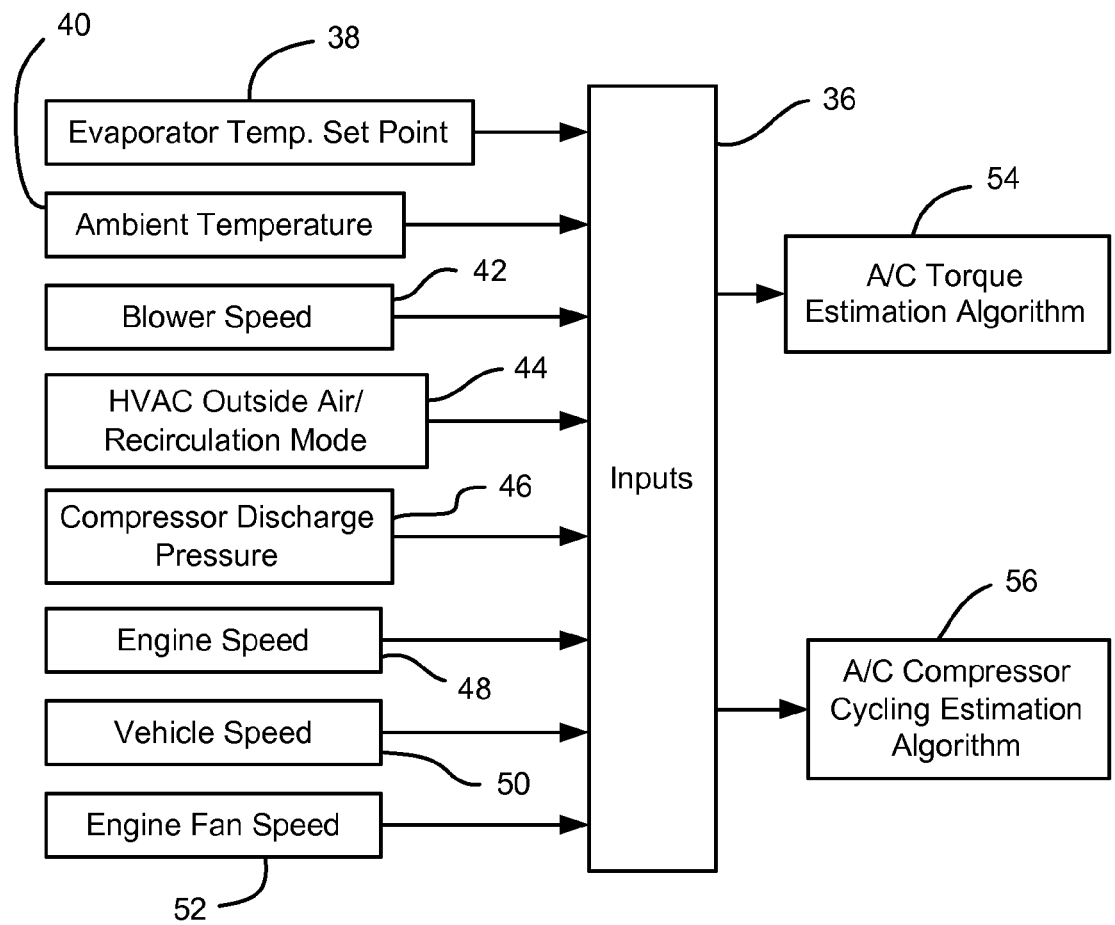
FIG. 2 is a schematic diagram illustrating vehicle operation inputs that may be employed for A/C compressor clutch control.

FIG. 2 illustrates vehicle operation inputs that may be employed for A/C compressor clutch control. The system inputs 36 may be received and used by the HVAC comfort control module and the engine control unit. An evaporator temperature set point 38, ambient temperature measurement 40, HVAC module blower speed 42, outside air/recirculation mode setting for the HVAC system 44, and compressor discharge pressure 46 are typical HVAC system inputs. Engine speed 48, vehicle speed 50 and engine fan speed 52 are typical engine control unit inputs. Various conventional systems and sensors may be employed to obtain the readings for these values received as system inputs 36. The system inputs 36 are then employed in an A/C torque estimation algorithm 54 and an A/C compressor cycling estimation algorithm 56. These algorithms are used for calculating values employed in the method shown in FIGS. 3A and 3B.

Figure 3A:
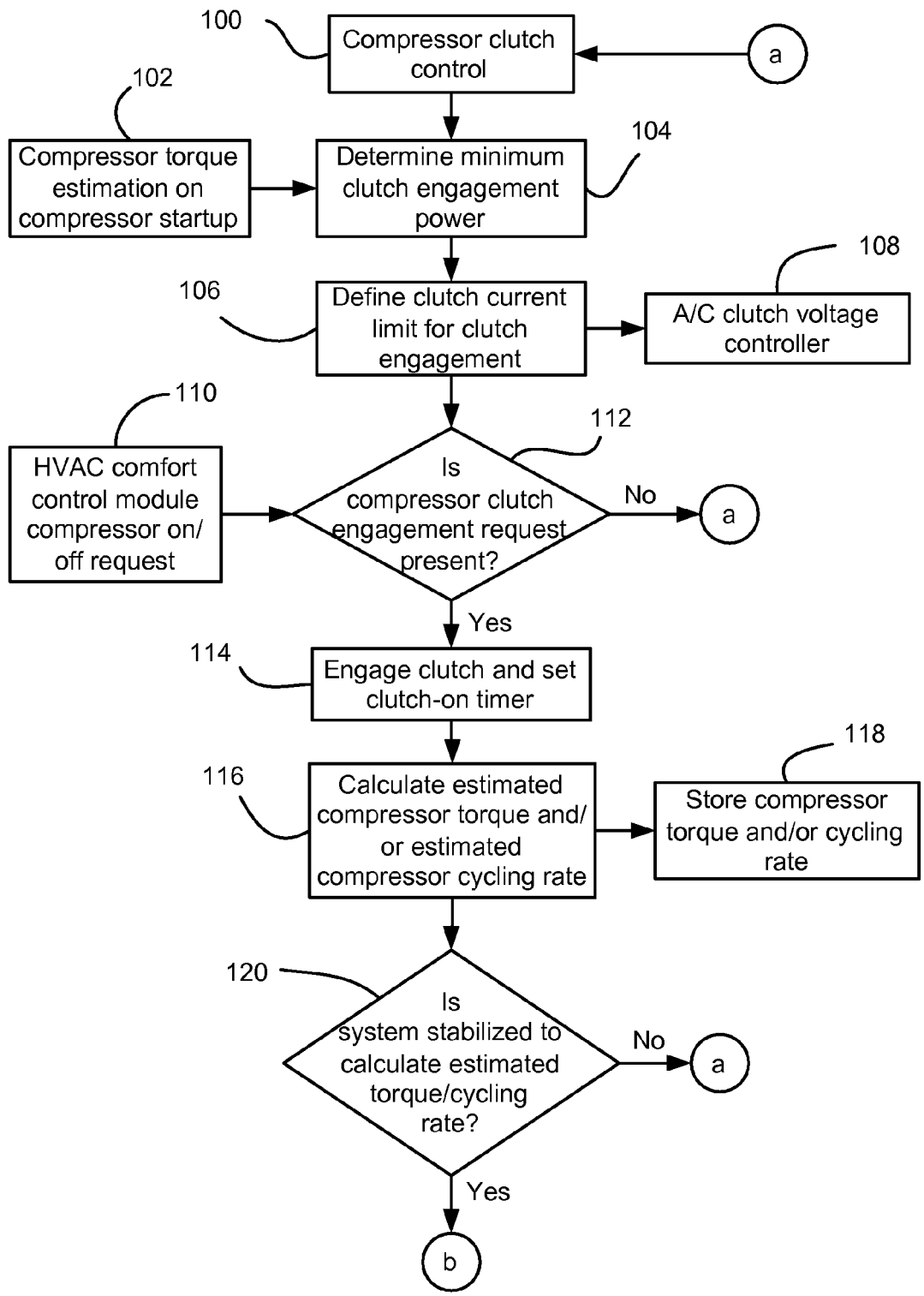
FIGS. 3A and 3B are a flow chart illustrating a method of controlling an A/C compressor clutch.
Figure 3B:
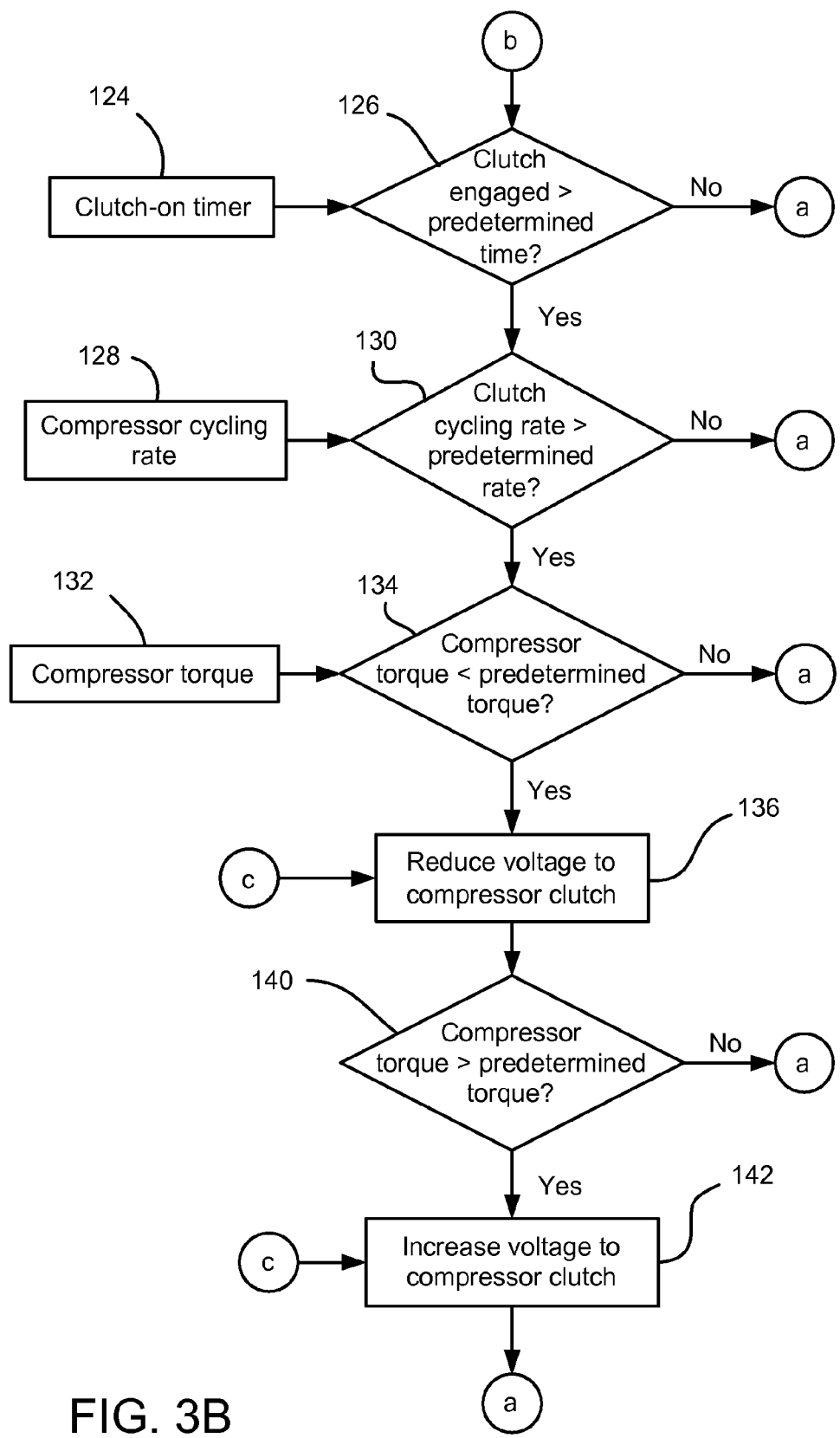

FIGS. 3A and 3B are a flow chart illustrating a method of controlling an A/C compressor clutch. Overall, the A/C clutch voltage controller uses signals from the engine control unit and the HVAC comfort module to control the amount of electrical power transmitted to the clutch. For example, the A/C clutch voltage controller may apply a full voltage (about twelve to fourteen and one half volts) for initial clutch engagement, and after engagement, the voltage controller may reduce the voltage to around fifty percent (about five to six volts) to maintain full engagement of the clutch. This difference in power usage is based on the power needed to pull the clutch into engagement versus what is required to maintain the engagement. Also, as engine and HVAC operating conditions warrant (for example changes in compressor torque), the voltage controller may adjust the voltage to accommodate these changing conditions. Consequently, full voltage is not applied at all times that the clutch is engaged, while maintaining full engagement, thus reducing the power consumption of the HVAC system.

Specifically referring now to the flow chart, compressor clutch control is initiated, block 100. A compressor torque at compressor startup is estimated, block 102. This value may result from the A/C torque estimation algorithm from FIG. 2. A minimum clutch engagement power is determined, block 104, based on estimated compressor torque requirements. From this a clutch current limit for clutch engagement is defined, block 106, including power and current duration. The defined clutch current limit is communicated to the A/C clutch voltage controller, block 108.

The HVAC comfort control module initiates the compressor on/off request, block 110, based on HVAC system settings and various system inputs. A determination is made whether compressor clutch engagement is requested, block 112. If not, then the process returns to block 100. If it is requested, then the A/C clutch voltage controller causes the clutch to be engaged and a clutch-on timer is set, block 114. An estimated compressor torque and/or estimated compressor cycling rate is calculated, block 116. The calculated compressor torque and/or compressor cycling rate are stored, block 118. A determination is made as to whether the system is stabilized sufficiently to accurately calculate the estimated compressor torque and/or compressor cycling rate, block 120. If not, then the process returns to block 100.

If stabilized sufficiently, then the clutch-on timer is read, block 124, and a determination is made whether the clutch has been engaged for longer than a predetermined clutch engagement time limit, block 126. If not, then the process returns to block 100. If so, the calculated compressor cycling rate is read, block 128 and a determination is made whether the clutch cycling rate is greater than a predetermined rate, block 130. If not, then the process returns to block 100. If so, the calculated compressor torque is read, block 132 and a determination is made whether the compressor torque is less than a predetermined torque threshold, block 134. One will note that, for blocks 116, 118, 120, 128, 130, 132, and 134, it is optional to use clutch cycling rate or compressor torque or both in this process.

If the compressor torque is not less than the predetermined torque threshold, then the process returns to block 100. If so, then the voltage to the compressor clutch is reduced, block 136. The amount of reduction may be based on a formula or look-up table, a representation of which is illustrated as the graph 138 in FIG. 4A. A determination is made as to whether the compressor torque is greater than a predetermined torque, block 140. If not, then the process returns to block 100. If so, then the voltage to the compressor clutch is increased, block 142 and the process returns to block 100. The amount of increase may again be based on the graph 138 of FIG. 4A.

Figure 4A:
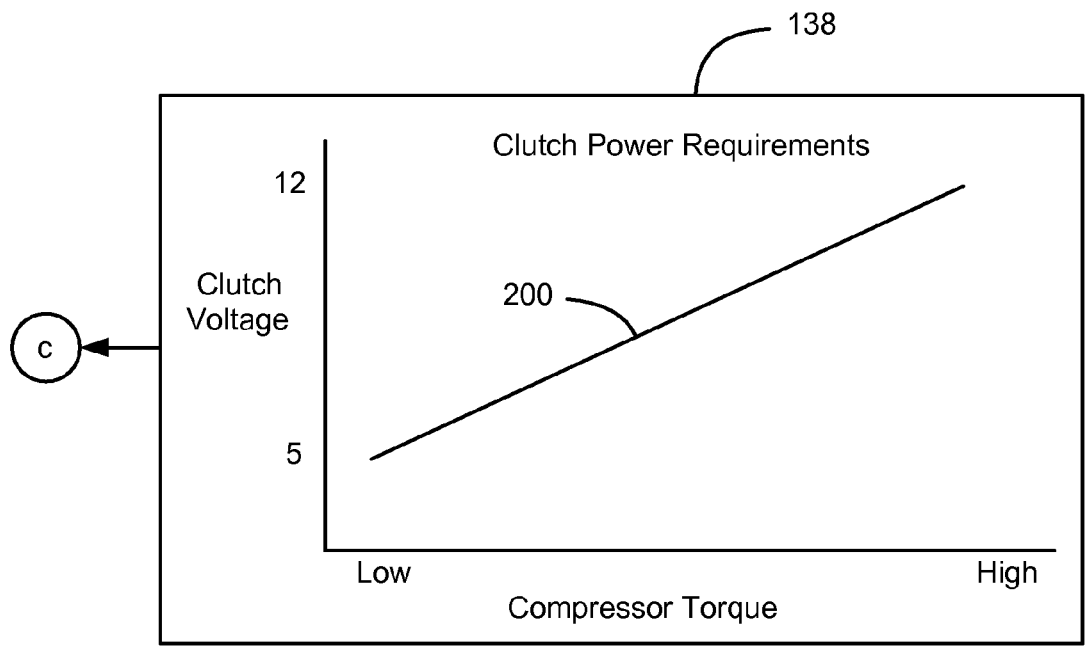
FIG. 4A is a graph illustrating an A/C clutch voltage versus compressor torque that may be employed in the method illustrated in FIGS. 3A and 3B.

FIG. 4A is a graph 138 illustrating a curve 200 for clutch voltage versus compressor torque, with the look up information employed as an input for blocks 136 and 142 of the flow chart in FIGS. 3A and 3B. This graph shows a ramped increase in the clutch voltage signal from the A/C clutch voltage controller as the compressor torque requirements increase.

Figure 4B:
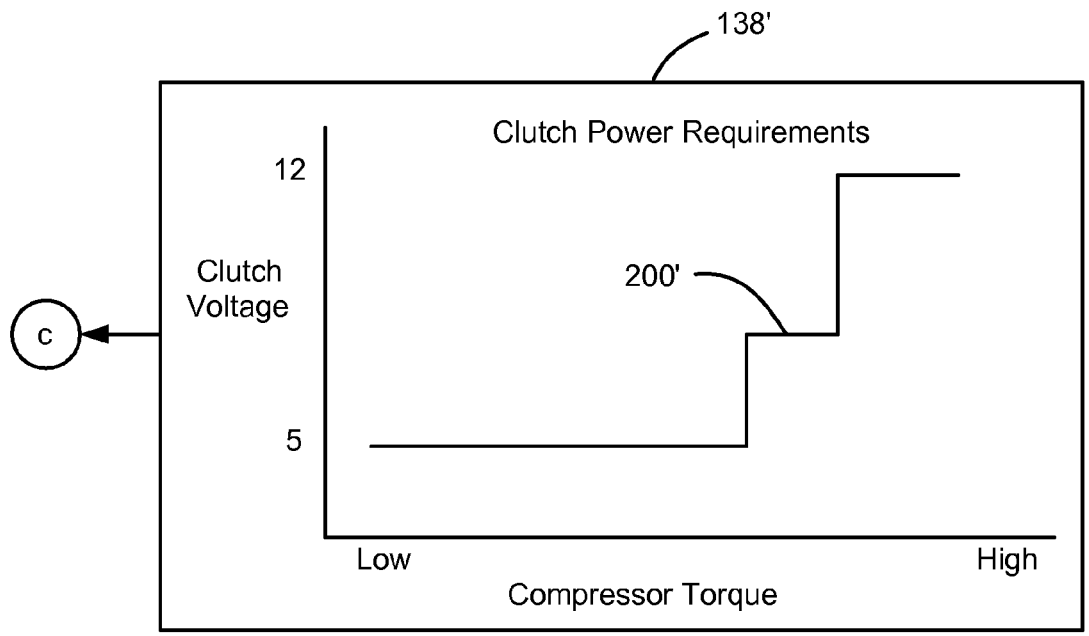
FIG. 4B is a graph similar to FIG. 4A, but illustrating an alternative A/C clutch voltage versus compressor torque.

FIG. 4B illustrates an alternative to FIG. 4A. The curve 200' in this graph 138' illustrates a clutch voltage versus compressor torque curve where the voltage increase is in stepped increments. This curve 200' shows two steps, but one step, or three or more steps can be used instead, if so desired.

An alternative method of operation may be to set a first, higher electrical power level for clutch engagement. Then, upon clutch engagement, the electric power level transitions, using a decaying time constant, to a second, lower electric power level. The time constant and the first and second electric power levels may be predetermined. This allows for simplified system operation and may allow one to avoid a communication link between the engine control unit and the A/C clutch voltage controller.

While certain embodiments of the present invention have been described in detail, those familiar with the art to which this invention relates will recognize various alternative designs and embodiments for practicing the invention as defined by the following claims.

What is claimed is:

1. A method of controlling an electric power input to a compressor clutch that selectively drives an A/C compressor in a vehicle HVAC system, the method comprising the steps of:
   (a) determining, with a controller, a first electric power level needed to cause the compressor clutch to move to a full engagement position from a compressor clutch non-engagement position;
   (b) applying the first electric power level, via a voltage controller, to the compressor clutch to cause the compressor clutch to move to the full engagement position;
   (c) determining, with the controller, a second electric power level, which is lower than the first electric power level, needed to maintain the compressor clutch in the full engagement position; and
   (d) applying the second electric power level, via the voltage controller, to the compressor clutch to maintain the compressor clutch in the full engagement position.

2. The method of claim 1 including steps:
   (e) calculating, with the controller, an estimated compressor torque;
   (f) determining, with the controller, a third electric power level needed to maintain the compressor clutch in the full engagement position based on the estimated compressor torque; and
   (g) applying the third electric power level, via the voltage controller, to the compressor clutch to maintain the compressor clutch in the full engagement position.

3. The method of claim 1 including steps:
   (e) calculating, with the controller, an estimated compressor cycling rate;
   (f) determining, with the controller, a third electric power level needed to maintain the compressor clutch in the full engagement position based on the estimated compressor cycling rate; and
   (g) applying the third electric power level, via the voltage controller, to the compressor clutch to maintain the compressor clutch in the full engagement position.

4. The method of claim 1 including steps:
   (e) calculating, with the controller, an estimated compressor cycling rate and an estimated compressor torque;
   (f) determining, with the controller, a third electric power level needed to maintain the compressor clutch in the full engagement position based on the estimated compressor cycling rate and the estimated compressor torque; and
   (g) applying the third electric power level, via the voltage controller, to the compressor clutch to maintain the compressor clutch in the full engagement position.

5. The method of claim 1 wherein step (a) is further defined by calculating an estimated compressor torque on compressor clutch engagement, and determining the first electric power level based on the estimated compressor torque.

6. The method of claim 1 wherein step (c) is further defined by waiting for a predetermined time after the compressor clutch moves into the full engagement position before determining the second electric power level.

7. The method of claim 1 wherein the first electric power level and the second electric power level are based on a ramped curve relating a clutch voltage to a compressor torque.

8. The method of claim 1 wherein the first electric power level and the second electric power level are based on a stepped curve relating a clutch voltage to a compressor torque.

9. The method of claim 1 wherein steps (b) and (d) are further defined by the voltage controller being an A/C clutch voltage controller receiving signals from an HVAC comfort control module and an engine control unit, which define the controller, and directing a voltage to the compressor clutch.

10. A vehicle HVAC system comprising:
   an A/C compressor;
   a compressor clutch configured to selectively engage the NC compressor with a source of driving torque;
   an HVAC comfort control module;
   an engine control unit; and
   an A/C clutch voltage controller configured to receive inputs from the HVAC comfort and control module and the engine control unit, and direct a zero voltage to the compressor clutch for clutch disengagement and a plurality of voltages to the compressor clutch for obtaining and maintaining clutch full engagement based on vehicle operating conditions.

11. The vehicle HVAC system of claim 10 wherein the plurality of voltages directed to the compressor clutch for obtaining and maintaining clutch full engagement are based on a compressor torque.

12. The vehicle HVAC system of claim 10 wherein the plurality of voltages directed to the compressor clutch for obtaining and maintaining clutch full engagement are based on a compressor cycling rate.

* * * * *